US012621197B2

(12) United States Patent
Liu et al.

(10) Patent No.: US 12,621,197 B2
(45) Date of Patent: May 5, 2026

(54) TERMINAL DEVICE AND PROCESSING METHOD

(71) Applicant: NTT DOCOMO, INC., Tokyo (JP)

(72) Inventors: Juan Liu, Beijing (CN); Wenjia Liu, Beijing (CN); Xiaolin Hou, Beijing (CN); Anxin Li, Beijing (CN); Lan Chen, Beijing (CN); Yoshihisa Kishiyama, Tokyo (JP); Takahiro Asai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 72 days.

(21) Appl. No.: 18/682,715

(22) PCT Filed: Aug. 10, 2021

(86) PCT No.: PCT/CN2021/111825
§ 371 (c)(1),
(2) Date: Feb. 9, 2024

(87) PCT Pub. No.: WO2023/015452
PCT Pub. Date: Feb. 16, 2023

(65) Prior Publication Data
US 2025/0132965 A1 Apr. 24, 2025

(51) Int. Cl.
*H04L 27/26* (2006.01)

(52) U.S. Cl.
CPC ...... *H04L 27/2615* (2013.01); *H04L 27/2605* (2013.01); *H04L 27/2647* (2013.01)

(58) Field of Classification Search
CPC ............. H04L 27/2615; H04L 27/2605; H04L 27/2647
See application file for complete search history.

(56) References Cited

U.S. PATENT DOCUMENTS

2019/0372813 A1* 12/2019 Moroga ............ H04L 27/26526

FOREIGN PATENT DOCUMENTS

CN 109246042 A 1/2019
CN 111526106 A 8/2020

OTHER PUBLICATIONS

Huawei, HiSilicon: "PTRS for DFT-s-OFDM", 3GPP TSG RAN WG1 Meeting #89, R1-1708142; Hangzhou, China, May 15-19, 2017 (4 pages).

* cited by examiner

*Primary Examiner* — Janice N Tieu
(74) *Attorney, Agent, or Firm* — Osha Bergman Watanabe & Burton LLP

(57) ABSTRACT

The present disclosure provides a terminal device and a processing method. The terminal device includes: a receiving unit configured to receive processing configuration information, wherein the processing configuration information indicates at least one of pre-processing and post-processing of Discrete Fourier Transform (DFT) spreading; a processing unit configured to determine at least one of the pre-processing and the post-processing of the DFT spreading according to the processing configuration information.

9 Claims, 5 Drawing Sheets

Method 400

TERMINAL DEVICE AND PROCESSING METHOD

TECHNICAL FIELD

The present disclosure relates to a field of wireless communication, and more particularly, to a processing method and a corresponding terminal device.

BACKGROUND

In order to realize the extremely high data rate requirement of 5G-Advanced and 6G, high frequency band related technologies such as millimeter wave (mmWave) and terahertz (THz) frequency have been regarded as recommended technologies in 5G-Advanced and 6G communication. System design with large bandwidth and high frequency band is limited by nonlinearity of Power Amplifiers (PAs). High spectrum efficiency, high power efficiency and high flexibility should be considered in waveform design to support more schemes. Due to the high Peak-to-Average Power Ratio (PAPR), Orthogonal Frequency Division Multiplexing waveforms with a Cyclic Prefix (CP-OFDM) will show signal distortion and performance degradation under the influence of the nonlinearity of the power amplifiers. In this case, Discrete Fourier Transform spread Orthogonal Frequency Division Multiplexing (DFT-s-OFDM) waveforms applied to 4G and 5G uplinks have an advantage of low peak-to-average power ratio, and can be regarded as candidate waveforms for 5G-Advanced and 6G.

On the other hand, waveforms obtained by the DFT-s-OFDM scheme have some problems such as low spectral efficiency and high out-of-band leakage, thus an improvement to the DFT-s-OFDM scheme is proposed. For example, a traditional cyclic prefix may be replaced with a Null Cyclic Prefix (NCP) or a Unique Word (UW) for a data sequence to be transmitted before Discrete Fourier Transform (DFT) is performed, so as to reduce out-of-band leakage and improve spectral efficiency. As another example, Frequency Domain Spectrum Shaping (FDSS) may be performed after the Discrete Fourier Transform (DFT) is performed, so as to affect a correlation distribution of time-domain signals, thereby reducing PAPR.

However, compatibility and flexibility of the current DFT-s-OFDM scheme and improved schemes thereof are poor, making it difficult to integrate with a future communication system framework, so it is still difficult to apply them in the communication system.

SUMMARY

According to an aspect of the present disclosure, there is provided an electronic device, including: a receiving unit configured to receive processing configuration information, wherein the processing configuration information indicates at least one of pre-processing and post-processing of Discrete Fourier Transform (DFT) spreading; a processing unit configured to determine at least one of the pre-processing and the post-processing of the DFT spreading according to the processing configuration information.

According to another aspect of the present disclosure, the receiving unit is further configured to receive terminal device capability information, the processing unit is further configured to determine the at least one of the pre-processing and the post-processing of the DFT spreading according to the terminal device capability information and the processing configuration information.

According to another aspect of the present disclosure, the receiving unit is further configured to receive key performance indication information, the processing unit is further configured to determine the at least one of the pre-processing and the post-processing of the DFT spreading according to the key performance indication and the processing configuration information.

According to another aspect of the present disclosure, the pre-processing includes at least one of head sequence and tail sequence insertion, a zero-padding operation, and re-ordering.

According to another aspect of the present disclosure, the post-processing includes at least one of data removal, phase compensation and superimposition, spectrum spreading, and spectrum shaping.

According to another aspect of the present disclosure, the processing configuration information includes a joint indication parameter indicating at least one of the pre-processing and the post-processing of the Discrete Fourier Transform (DFT) spreading; or the processing configuration information includes at least one of a pre-processing parameter indicating the DFT spreading and a post-processing parameter indicating the DFT spreading.

According to another aspect of the present disclosure, the processing unit determines the at least one of the pre-processing and the post-processing of the DFT spreading according to the processing configuration information based on a pre-determined pre-processing and post-processing table.

According to another aspect of the present disclosure, the processing unit further performs a DFT spreading operation according to the processing configuration information.

According to another aspect of the present disclosure, the receiving unit is configured to receive a DFT spreading instruction; the processing unit is further configured to perform a DFT spreading operation according to the DFT spreading instruction.

According to another aspect of the present disclosure, there is provided a processing method applied to a terminal device, including: receiving processing configuration information, wherein the processing configuration information indicates at least one of pre-processing and post-processing of Discrete Fourier Transform (DFT) spreading; determining at least one of the pre-processing and the post-processing of the DFT spreading according to the processing configuration information.

BRIEF DESCRIPTION OF THE DRAWINGS

The above and other objects, features and advantages of the present disclosure will become more apparent by describing embodiments of the present disclosure in more detail with reference to accompanying drawings. The accompanying drawings are provided to provide a further understanding of the embodiments of the present disclosure, constitute a part of the specification, serve to explain the present disclosure together with the embodiments of the present disclosure, and do not constitute a limitation of the present disclosure. In the drawings, like reference numerals generally represent like parts or steps.

DETAILED DESCRIPTION OF THE EMBODIMENTS

Figure 1:
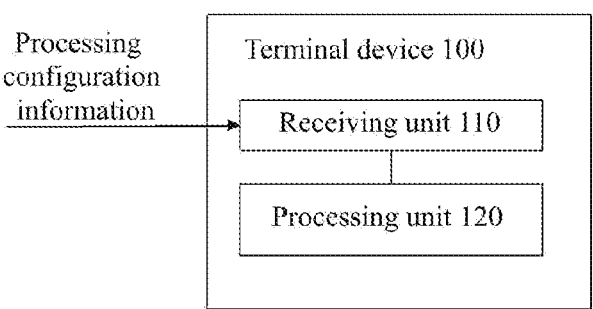
FIG. 1 is a schematic block diagram showing an electronic device according to an embodiment of the present disclosure.

In order to make the objects, technical solutions and advantages of the present disclosure more obvious, exemplary embodiments according to the present disclosure will be described in detail below with reference to the accompanying drawings. Like reference numerals refer to like elements throughout the drawings. It should be appreciated that the embodiments described herein are merely illustrative and should not be construed as limiting the scope of the present disclosure.

As described above, in order to improve waveforms obtained by the DFT-s-OFDM scheme, several enhancement schemes based on DFT-s-OFDM are proposed. For example, a traditional cyclic prefix may be replaced with a Null Cyclic Prefix (NCP) or a Unique Word (UW) for a data sequence to be transmitted before Discrete Fourier Transform (DFT) is performed, so as to reduce out-of-band leakage and improve spectral efficiency. As another example, Frequency Domain Spectrum Shaping (FDSS) may be performed after the Discrete Fourier Transform (DFT) is performed, so as to affect a correlation distribution of time-domain signals, thereby reducing PAPR. However, compatibility and flexibility of the current DFT-s-OFDM scheme and improved schemes thereof are poor, making it difficult to alter according to changes in communication environment and user capability, so it is still difficult to apply them in the communication system. Therefore, it is desirable to provide a method and a corresponding terminal device that can flexibly configure processing required for input sequences.

A terminal device according to an embodiment of the present disclosure will be described below with reference to FIG. 1. FIG. 1 is a schematic block diagram showing an electronic device according to an embodiment of the present disclosure. The terminal device 100 according to the embodiment of the present disclosure may include a receiving unit 110 and a processing unit 120. In addition to the receiving unit and the processing unit, the terminal device 100 may further include other components. However, since these components are irrelevant to content of the embodiments of the present disclosure, illustration and description thereof are omitted herein. The terminal described herein may include various types of terminals, such as a user equipment (UE), a mobile terminal (or referred to as a mobile station) or a fixed terminal. However, the terminal and the UE are sometimes used interchangeably hereinafter for convenience.

Figure 2A:
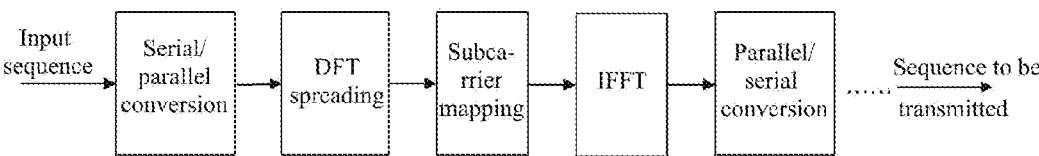
FIG. 2A is a schematic diagram showing that a terminal device processes an input sequence according to DFT spreading to determine a sequence to be transmitted.
Figure 2B:
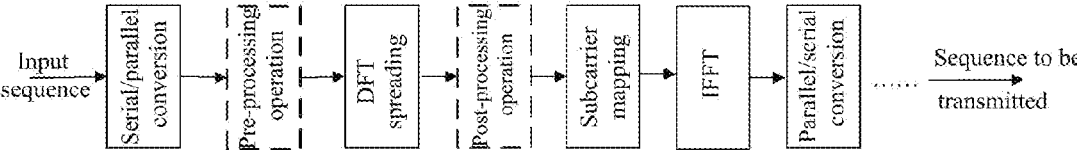
FIG. 2B is a schematic diagram showing that in the process of determining the sequence to be transmitted, pre-processing and post-processing of the DFT spreading are added to enhance the DFT-s-OFDM scheme.

In the embodiment according to the present disclosure, an improved scheme for DFT-s-OFDM may be divided into pre-processing and post-processing of DFT spreading, depending on whether it is performed before or after the DFT spreading. FIG. 2A is a schematic diagram showing that a terminal device processes an input sequence according to the DFT spreading to determine a sequence to be transmitted. As shown in FIG. 2A, the input sequence is inputted to a DFT spreading module after serial/parallel conversion to obtain a DFT spread sequence, thereafter a subcarrier mapping operation, an inverse discrete Fourier transform (IFFT) operation and a parallel/serial conversion operation and so on are performed on the DFT spread sequence to determine the sequence to be transmitted. FIG. 2B is a schematic diagram showing that in the process of determining the sequence to be transmitted, pre-processing and post-processing of the DFT spreading are added to enhance the DFT-s-OFDM scheme. As shown in FIG. 2B, in this example, the pre-processing of the DFT spreading is an operation before and immediately next to the DFT spreading, and the post-processing of the DFT spreading is an operation after and immediately next to the DFT spreading. For convenience, the pre-processing of the DFT spreading may sometimes be referred to as pre-processing and the post-processing of the DFT spreading as post-processing hereinafter.

Returning to FIG. 1, the receiving unit 110 of the terminal device 100 may receive processing configuration information, wherein the processing configuration information indicates at least one of pre-processing and post-processing of Discrete Fourier Transform (DFT) spreading. The processing unit 120 determines at least one of the pre-processing and the post-processing of the DFT spreading according to the processing configuration information. For example, the pre-processing may include inserting a known sequence into a data sequence to be transmitted before the DFT spreading is performed, to replace a traditional CP. For example, the known sequence may be inserted into the data sequence to be transmitted by means of NCP or UW. As another example, the post-processing may include spectrum spreading, spectrum shaping and the like.

In addition, although a DFT-s-OFDM scheme based on Faster-Than-Nyquist (FTN) modulation has also been proposed at present, this scheme needs to compress a time-domain sampled signal by inserting a Cyclic Prefix (CP) into a sequence after an IFFT operation and a parallel/serial conversion operation and performing FTN modulation on it, so as to improve the spectral efficiency. That is, this scheme does not improve DFT spreading by operations immediately before or after the DFT spreading, so it is difficult to use a unified transmitter structure with NCP, UW, FDSS and other enhancement technologies. In view of this, an alternative time-domain compression method is proposed in an example according to the present disclosure. Specifically, a zero-embedded sequence may be determined by performing a zero-padding operation on a sequence to be compressed according to at least a part of a compression factor, a discrete Fourier transform spreading operation is performed according to the zero-embedded sequence to determine a spread sequence, and at least one of a data deletion operation and a data superimposition operation is performed based on the spread sequence to obtain a compressed sequence. The terminal device 100 may further include an input unit. In the embodiment of the present disclosure, the compression factor may refer to a ratio of the number of elements of the compressed sequence determined by the processing unit 120 to the number of elements of the sequence to be compressed obtained by the input unit as described below. For example, the compression factor may be set to a, the a may be set to $\alpha = b/c$, $b \leq c$, b and c are positive integers, and b is related to the number of zeros in the zero-padding operation described below. For example, in the zero-padding operation described below, b may be one value, that is, in the zero-padding operation, every element in the sequence to be compressed is supplemented with the same number of zeros, such as b−1 zeros. The c may be related to the number of DFT spreading subsets described below or the number of sampling points of a DFT spreading set. In the zero-padding operation, it is necessary to make the number of elements of the zero-embedded sequence determined after the zero-padding operation consistent with the number of the sampling points of the DFT spreading set.

Figure 3A:
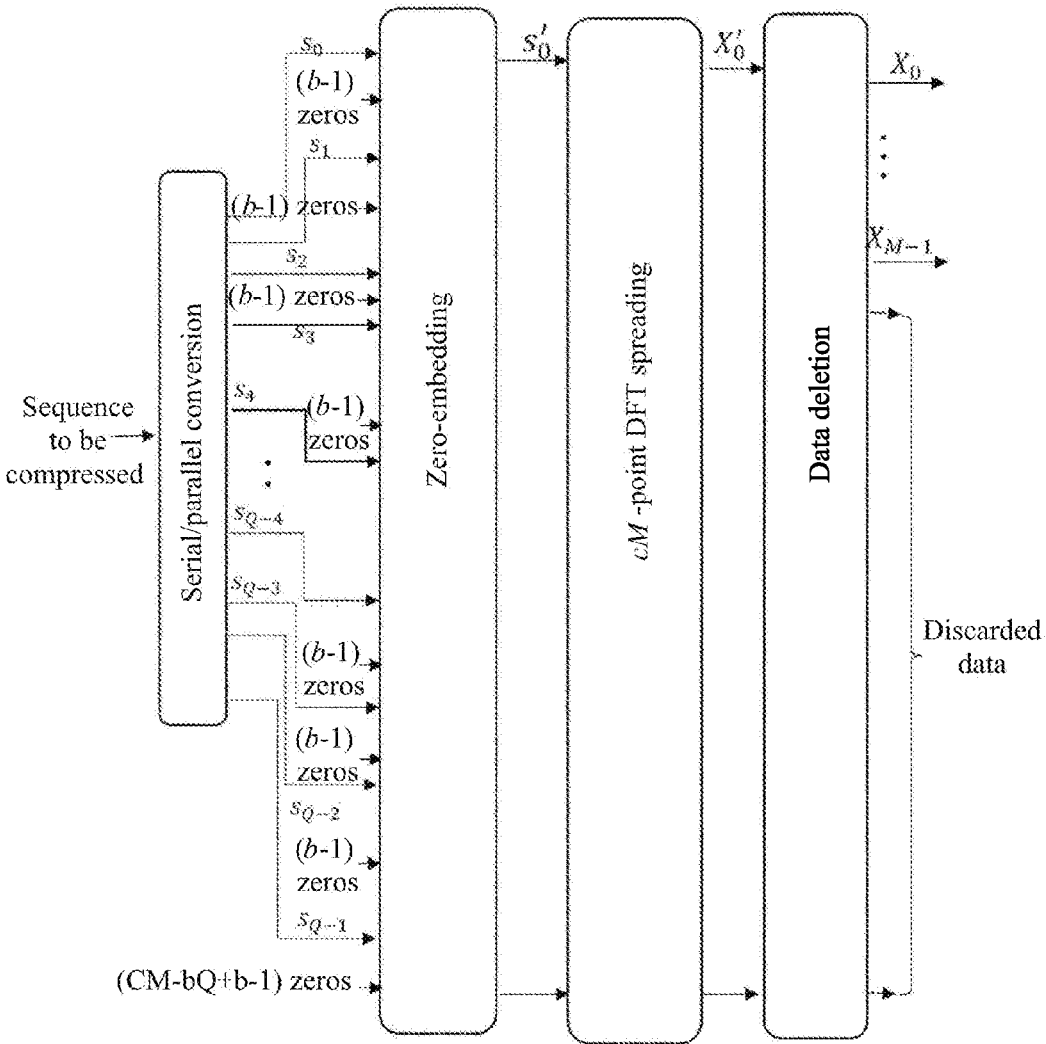
FIG. 3A is a schematic diagram illustrating a compression method according to an embodiment of the present disclosure.

The compression method according to an embodiment of the present disclosure will be described below with reference to FIGS. 3A and 3B. FIG. 3A is a schematic diagram illustrating a compression method according to an embodiment of the present disclosure. In the example shown in FIG. 3A, a zero-embedded sequence $$s' = [s'_0 \; ... \; s'_i \; ... \; s'_{cM-1}]^T, 0 \le i \le cM - 1$$

is determined after the zero-padding operation is performed on a sequence to be compressed $s=[s_0 \; ... \; s_i \; ... \; s_{Q-1}]^T$, $0 \le i \le Q-1$ according to a compression factor $\alpha$, and a cM-point DFT spreading operation is performed according to the zero-embedded sequence to determine a DFT spread sequence $$X' = [X'_0 \; ... \; X'_i \; ... \; X'_{cM-1}]^T, 0 \le i \le cM - 1.$$

Next, data deletion is performed based on the DFT spread sequence to determine a compressed sequence $X=[X_0 \; ... \; X_i \; ... \; X_{M-1}]^T$, $0 \le i \le M-1$, where the compressed sequence has M frequency-domain symbols, M is an integer greater than zero, and M is less than or equal to Q.

In the zero-padding operation, each element in the sequence to be compressed $s=[s_0 \; ... \; s_i \; ... \; s_{Q-1}]^T$ with Q time-domain symbols is supplemented with b−1 zeros, so the zero-embedded sequence $$s' = [s'_0 \; ... \; s'_i \; ... \; s'_{cM-1}]^T$$

is obtained. Thus, the i-th element s'_i in the zero-embedded sequence $$s' = [s'_0 \; ... \; s'_i \; ... \; s'_{cM-1}]^T$$

may also be expressed by formula (1):

$$s'_i = \begin{cases} s_{i/b}, & i \in \{0, b, ... , b(Q-1)\} \\ 0, & i \notin \{0, b, ... , b(Q-1)\} \end{cases} \tag{1}$$

Therefore, the sequence to be compressed $s=[s_0 \; ... \; s_i \; ... \; s_{Q-1}]^T$ with Q time-domain symbols becomes the zero-embedded sequence $$s' = [s'_0 \; ... \; s'_i \; ... \; s'_{cM-1}]^T$$

with M×c time-domain symbols after the zero-padding operation. Next, the cM-point DFT spreading operation is performed on the zero-embedded sequence $$s' = [s'_0 \; ... \; s'_i \; ... \; s'_{cM-1}]^T$$

to obtain $$X' = [X'_0 \; ... \; X'_i \; ... \; X'_{cM-1}]^T, 0 \le i \le cM - 1.$$

Here, in order to perform the cM-point DFT spreading operation on the zero-embedded sequence $$s' = [s'_0 \; ... \; s'_i \; ... \; s'_{cM-1}]^T$$

with cM time-domain symbols, it may be set that $$Q = \left\lfloor \frac{b}{c} M \right\rfloor.$$

The relationship between the DFT spread sequence X' and the zero-embedded sequence s' may be shown by formula (2):

$$X' = F^{cM} s' \tag{2}$$

where $F^{cM}$ is a cM-point DFT matrix. Data deletion is performed on the aforesaid DFT spread sequence X' to determine the compressed sequence $X=[X_0 \; ... \; X_i \; ... \; X_{M-1}]^T$, $0 \le i \le M-1$. Here, for the i-th element in the compressed sequence X, it may be calculated by formula (3) as follows:

$$X_i = X'_i = \frac{1}{\sqrt{M}} \sum_{m=0}^{cM-1} s'_m e^{-\frac{j2\pi im}{cM}} = \frac{1}{\sqrt{M}} \sum_{m=0}^{Q-1} s_m e^{-\frac{j2\pi\left(\frac{b}{c}m\right)}{M}} \tag{3}$$

When data deletion is performed on the above DFT spread sequence X', it is preferable to delete low-order harmonics in the frequency domain, so as to maintain relative integrity of data.

Therefore, in the example shown in FIG. 3A, pre-operation of the DFT spreading may include the zero-padding operation, and post-operation of the DFT spreading may include data deletion.

Figure 3B:
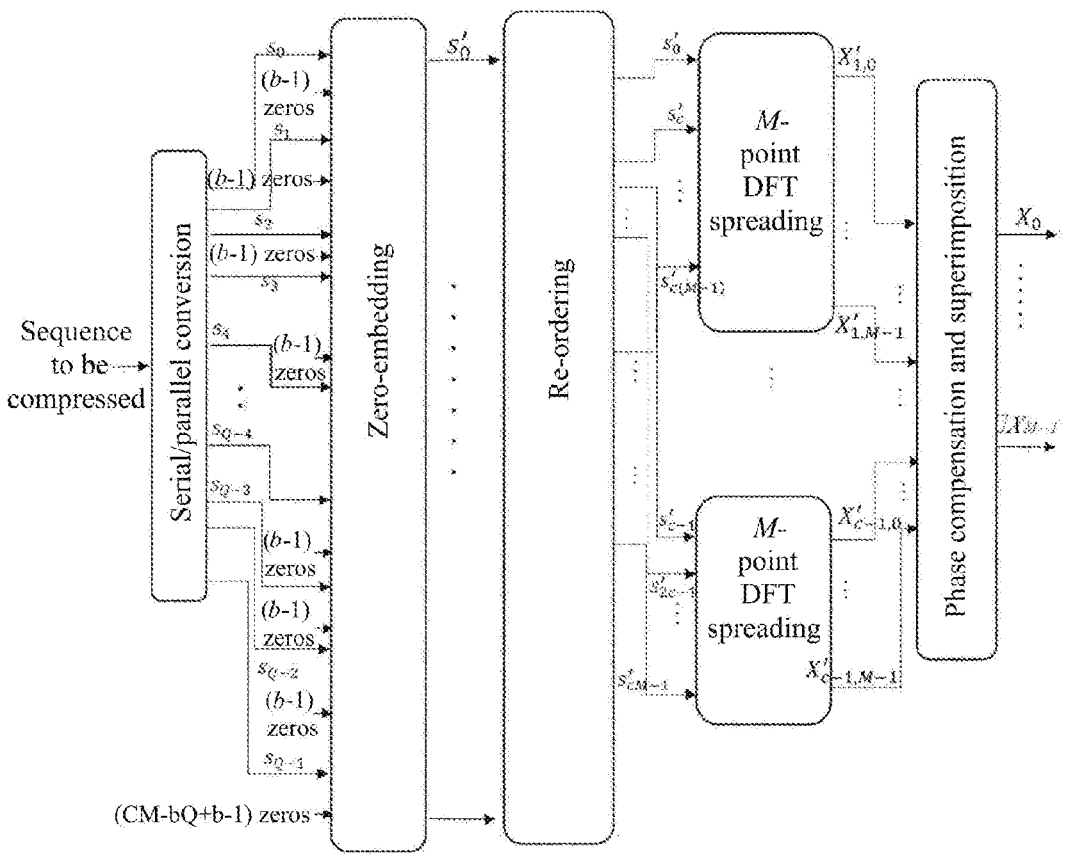
FIG. 3B is a schematic diagram illustrating a compression method according to another embodiment of the present disclosure.

FIG. 3B is a schematic diagram illustrating a compression method according to another embodiment of the present disclosure. As shown in FIG. 3B, in this example, after the zero-padding operation is performed, re-ordering is further performed according to the zero-embedded sequence to determine a plurality of zero-embedded subsequences. For each zero-embedded subsequence, M-point discrete Fourier transform spreading operation is respectively performed to determine a plurality of spread subsequences, and a data superimposition operation is performed based on the plurality of spread subsequences to determine the compressed sequence. Further, the data superimposition operation may further include performing phase compensation operation on the plurality of spread subsequences respectively, and superimposing the plurality of phase-compensated spread subsequences.

The zero-padding operation in FIG. 3B (also referred to as the zero-embedding operation) is the same as that in FIG. 3A, and details will not be described herein again.

As shown in FIG. 3B, the zero-embedded sequence $$s' = [s'_0 \ \ldots \ s'_i \ \ldots \ s'_{cM-1}]^T, \ 0 \leq i \leq cM - 1$$

is determined based on the zero-padding operation. Next, re-ordering is performed according to the zero-embedded sequence s', to determine c zero-embedded subsequences with M elements, and the k-th zero-embedded subsequence (where k=0, 1, . . . , c−1,) among the c zero-embedded subsequences with M elements may also be shown as $$\overline{s}'_k = \left[s'_{k+c} \ \ldots \ s'_{k+ic} \ \ldots \ s'_{k+(M-1)c}\right]^T, \ 0 \leq i \leq M - 1.$$

For each of the c zero-embedded subsequences, the DFT spreading operation is respectively performed through c M-point DFT spreading matrices to determine c DFT spread subsequences.

For the k-th DFT spread subsequence (where k=0, 1, . . . , c−1) among the c DFT spread subsequences, it may be shown as $$X'_k = \left[X'_{k,0} \ \ldots \ X'_{k,i} \ \ldots \ X'_{k,M-1}\right]^T, \ 0 \leq i \leq M - 1.$$

Here, the relationship between the DFT spread subsequence $X'_k$ and the zero-embedded subsequence $$\overline{s}'_k$$

may be shown by formula (4).

$$X'_k = F^M \overline{s}'_k \tag{4}$$

where $F^M$ is an M-point DFT matrix. The compressed sequence=$[X_0 \ldots X_i \ldots X_{M-1}]^T$, $0 \leq i \leq M-1$ may be obtained by performing the phase compensation operation and data superimposition on the above c DFT spread subsequences X'. Here, for the i-th element in the compressed sequence X, it may be calculated by formula (5) as follows:

$$X_i = \sum_{k=0}^{c-1} e^{-\frac{j2\pi ki}{cM}} X'_{k,i} = \frac{1}{\sqrt{M}} \sum_{k=0}^{c-1} e^{-\frac{j2\pi ki}{cM}} \sum_{m=0}^{M-1} s'_{k+mc} e^{-\frac{j2\pi im}{M}} = \tag{5}$$

-continued $$\frac{1}{\sqrt{M}} \sum_{m=0}^{Q-1} s_m e^{-\frac{j2\pi i\left(\frac{b}{c}m\right)}{M}}$$

Therefore, the compressed sequence $X=[X_0 \ldots X_i \ldots X_{M\_1}]^T$ with M subcarriers may be obtained, based on the sequence to be compressed $s=[s_0 \ldots s_i \ldots s_{Q-1}]^T$ with Q elements.

Therefore, in the example shown in FIG. 3B, the pre-operation of the DFT spreading may include the zero-padding operation and the reordering operation, and the post-operation of the DFT spreading may include the phase compensation and superimposition operation.

Returning to FIG. 1, according to an example of the present disclosure, the processing configuration information includes a joint indication parameter indicating at least one of the pre-processing and the post-processing of the Discrete Fourier Transform (DFT) spreading. That is, the joint indication parameter may indicate at least one of the pre-processing of the DFT spreading as described above, may indicate at least one of the post-processing of the DFT spreading as described above, and may also indicate the pre-processing and post-processing of the DFT spreading that the UE needs to perform concurrently. Alternatively, the processing configuration information includes at least one of a pre-processing parameter indicating the pre-processing of the DFT spreading and a post-processing parameter indicating the post-processing of the DFT spreading. Specifically, the pre-processing parameter and the post-processing parameter may respectively indicate the pre-processing and post-processing of the DFT spreading that the UE needs to perform.

For example, the joint indication parameter or at least one of the pre-processing parameter and the post-processing parameter may be notified via Radio Resource Control (RRC) signaling, MAC control element (MAC CE) or Downlink Control Information (DCI). For example, a field "PrePostprocessing scaling" may be added in RRC, MAC CE or DCI signaling, to facilitate notifying the joint indication parameter. As another example, fields "Preprocessing scaling" and "Postprocessing scaling" may be added in RRC, MAC CE or DCI signaling, to notify the pre-processing parameter and the post-processing parameter respectively. Furthermore, according to another example of the present disclosure, when the receiving unit 110 does not receive the processing configuration information notified by, for example, the joint indication parameter or at least one of the pre-processing parameter and the post-processing parameter, the processing unit does not perform the pre-processing operation and the post-processing operation.

In addition, existing information of the current communication system may be used to indicate the processing configuration information without setting a new parameter. According to an example of the present disclosure, processing configuration information may be indicated via a Modulation and Coding Scheme (MCS) field in DCI, such that the processing unit 120 performs at least one of the pre-processing and the post-processing of the DFT spreading according to the processing configuration information.

For example, if the MCS in DCI received by the receiving unit 110 is lower than a specific value or a specific modulation order (for example, QPSK), it is determined to perform time-domain compression processing. In this case, the processing unit 120 may perform zero-padding on the sequence to be compressed according to at least a part of the compression factor as shown in FIG. 3A as the pre-operation, and correspondingly, perform data deletion on the DFT spread sequence as the post-operation. Alternatively, the processing unit 120 may perform zero-padding and re-ordering on the sequence to be compressed according to at least a part of the compression factor as shown in FIG. 3B as the pre-operation, and correspondingly, perform the data superimposition operation including phase compensation and superimposition on the DFT spread sequence as the post-operation.

As another example, if the value of MCS indicated by DCI is located in the middle of an MCS value range, or it is a specific modulation order (for example, 16QAM), it is determined to perform frequency-domain spectrum shaping in the post-processing. Furthermore, if the value of MCS indicated by DCI is higher than a predetermined threshold or a specific modulation order (for example, 64QAM), it is determined that both spectrum spreading and frequency-domain spectrum shaping will be used in the post-processing.

According to another example of the present disclosure, the processing configuration information may be indicated by an operating frequency band field in DCI, such that the processing unit 120 performs at least one of the pre-processing and the post-processing of the DFT spreading according to the processing configuration information. For example, if an operating frequency band indicated in DCI is lower than a predetermined value, it may be determined that a head-tail zero sequence insertion operation or a head-tail UW sequence insertion operation is performed in the pre-processing.

According to another example of the present disclosure, the processing configuration information may be indicated jointly by the operating frequency band field and the MCS field in DCI, such that the processing unit 120 performs at least one of the pre-processing and the post-processing of the DFT spreading according to the processing configuration information. For example, if the MCS indicated in DCI is lower than a specific threshold or a specific modulation order (for example, QPSK) and an operating frequency band indicated in the scheduling DCI is lower than a certain value, it is determined to perform time-domain compression processing. In this case, the processing unit 120 may perform zero-padding on the sequence to be compressed according to at least a part of the compression factor as shown in FIG. 3A as the pre-operation, and correspondingly, perform data deletion on the DFT spread sequence as the post-operation. Alternatively, the processing unit 120 may perform zero-padding and re-ordering on the sequence to be compressed according to at least a part of the compression factor as shown in FIG. 3B as the pre-operation, and correspondingly, perform a data superimposition operation including phase compensation and superimposition on the DFT spread sequence as the post-operation. If the MCS indicated in the scheduling DCI is higher than a specific threshold and the operating frequency band indicated in the scheduling DCI is lower than a specific threshold, it may be determined to perform the head-tail zero sequence insertion operation or the head-tail UW sequence insertion operation in the pre-processing. In addition, if the MCS indicated in the scheduling DCI is lower than a specific threshold or a specific modulation order (for example, QPSK) and the operating frequency band indicated in the scheduling DCI is higher than a specific threshold, it is determined to perform the time-domain compression processing of FIG. 3A and the head-tail zero sequence insertion operation or the head-tail UW sequence insertion operation in the pre-processing, or alternatively, it may be determined to perform the time-domain compression processing of FIG. 3B.

In addition, when the value of the MCS field or the operating frequency band field in DCI received by the receiving unit 110 does not meet the predetermined condition, the pre-processing operation and the post-processing operation may not be performed.

According to an example of the present disclosure, the processing unit 120 may determine at least one of the pre-processing and the post-processing of the DFT spreading according to the processing configuration information based on a pre-determined pre-processing and post-processing table. For example, the pre-processing and post-processing table may be a table that includes both the above-mentioned pre-processing and post-processing. Alternatively, sub-tables may be set for the pre-processing and the post-processing, respectively.

According to another example of the present disclosure, the receiving unit 110 may further receive terminal device capability information. The processing unit 120 may determine at least one of the pre-processing and the post-processing of the DFT spreading according to the terminal device capability information and the processing configuration information. In this case, a plurality of pre-processing and post-processing sub-tables for different UE capabilities may be set in advance. The processing unit 120 may determine a pre-processing and post-processing sub-table corresponding to the terminal device 110 according to the terminal device capability information, and determine at least one of the pre-processing and the post-processing according to the processing configuration information.

According to another example of the present disclosure, the receiving unit 110 may further receive key performance indication information. The processing unit 120 may determine at least one of the pre-processing and the post-processing of the DFT spreading according to the key performance indication information and the processing configuration information. In this case, a plurality of pre-processing and post-processing sub-tables for different key performances may be set in advance. The processing unit 120 may determine a corresponding pre-processing and post-processing sub-table according to the key performance indication information, and determine at least one of the pre-processing and the post-processing according to the processing configuration information. For example, the key performance indication information may indicate improving at least one of PAPR, spectrum efficiency, and out-of-band leakage.

How to perform at least one of the pre-processing and the post-processing of the DFT spreading is explained above in detail with reference to FIGS. 1-3B. According to another example of the present disclosure, the terminal device 100 may further determine whether to perform the DFT spreading operation. For example, when the receiving unit 110 receives the above processing configuration information, the processing unit 120 may determine to perform the DFT spreading operation according to the received processing configuration information, otherwise, it will not perform the DFT spreading operation. As another example, whether to perform the DFT spreading operation may be indicated by scheduling information in DCI signaling. If FDRA in DCI scheduled PUSCH/PDSCH transmission indicates continuous resource blocks and satisfies the following formula (6), it may be determined to perform the DFT spreading operation:

$$M_{RB}^{PUSCH/PDSCH} = 2^{\alpha_2} \cdot 3^{\alpha_3} \cdot 5^{\alpha_5} \qquad (6)$$

where $\alpha_2$, $\alpha_3$ and $\alpha_5$ are integers greater than or equal to zero. Alternatively, if the value of the MCS field of DCI signaling is less than a specific threshold, it may be determined to perform the DFT spreading operation.

In addition, the terminal device may be informed whether to perform the DFT spreading operation by setting a DFT spreading instruction. In this case, the receiving unit 110 may receive the DFT spreading instruction, and the processing unit 120 may perform the DFT spreading operation according to the DFT spreading instruction, otherwise, it will not perform the DFT spreading operation. For example, the DFT spreading instruction may be notified by at least one of RRC signaling, MAC CE signaling and DCI signaling.

Figure 4:
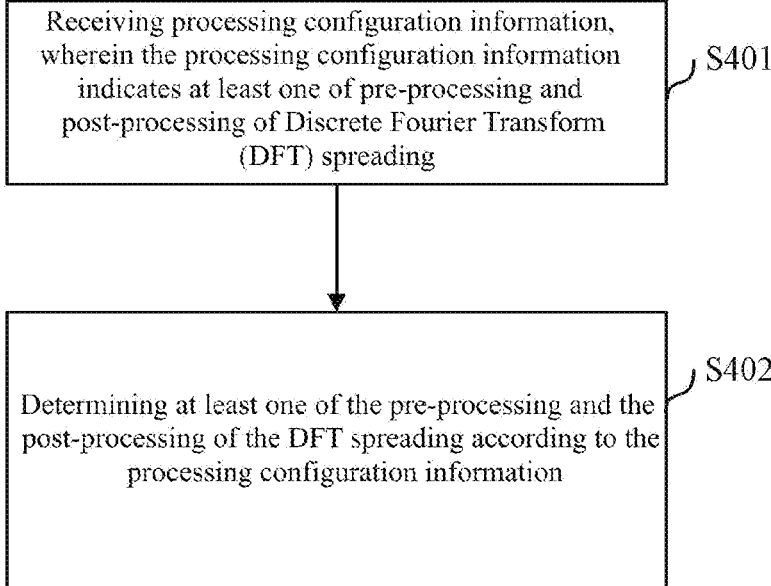
FIG. 4 is a flowchart of a processing method according to an embodiment of the present disclosure.

Next, a processing method according to an embodiment of the present disclosure will be described with reference to FIG. 4. FIG. 4 is a flowchart of a processing method 400 according to an embodiment of the present disclosure. Since steps of the processing method 400 correspond to the operations of the electronic device 100 described above with reference to FIGS. 1-3B, detailed description of the same content is omitted herein for the sake of simplicity.

As shown in FIG. 4, in step S401, processing configuration information is received, wherein the processing configuration information indicates at least one of pre-processing and post-processing of Discrete Fourier Transform (DFT) spreading. In step S402, at least one of the pre-processing and the post-processing of the DFT spreading is determined according to the processing configuration information. For example, the pre-processing may include inserting a known sequence into a data sequence to be transmitted before the DFT spreading is performed, to replace a traditional CP. For example, the known sequence may be inserted into the data sequence to be transmitted by means of NCP or UW. As another example, the post-processing may include spectrum spreading, spectrum shaping and the like.

In addition, although a DFT-s-OFDM scheme based on Faster-Than-Nyquist (FTN) modulation has been also proposed at present, this scheme needs to compress a time-domain sampled signal by inserting Cyclic Prefix (CP) into the sequence after the IFFT operation and the parallel/serial conversion operation and performing FTN modulation on it, so as to improve the spectral efficiency. That is, this scheme does not improve DFT spreading by operations immediately before or after the DFT spreading, so it is difficult to use a unified transmitter structure with NCP, UW, FDSS and other enhancement technologies. In view of this, an alternative time-domain compression method is proposed in an example according to the present disclosure. Specifically, a zero-embedded sequence may be determined by performing a zero-padding operation on a sequence to be compressed according to at least a part of a compression factor, a discrete Fourier transform spreading operation is performed according to the zero-embedded sequence to determine a spread sequence, and at least one of a data deletion operation and a data superimposition operation is performed based on the spread sequence to obtain a compressed sequence. Therefore, in an example according to the present disclosure, the pre-processing of the DFT spreading may further include at least one of the zero-padding operation and reordering, and the post-processing may further include at least one of data removal, phase compensation and superimposition. The compression method according to the embodiment of the present disclosure has been described above in detail with reference to FIGS. 3A and 3B, so details thereof are not repeatedly described herein.

According to an example of the present disclosure, the processing configuration information includes a joint indication parameter indicating at least one of the pre-processing and the post-processing of Discrete Fourier Transform (DFT) spreading. That is, the joint indication parameter may indicate at least one of the pre-processing of the DFT spreading as described above, may indicate at least one of the post-processing of the DFT spreading as described above, and may also indicate the pre-processing and post-processing of the DFT spreading that the UE needs to perform concurrently. Alternatively, the processing configuration information includes at least one of a pre-processing parameter indicating the pre-processing of the DFT spreading and a post-processing parameter indicating the post-processing of the DFT spreading. Specifically, the pre-processing parameter and the post-processing parameter may respectively indicate the pre-processing and post-processing of the DFT spreading that the UE needs to perform.

For example, the joint indication parameter or at least one of the pre-processing parameter and the post-processing parameter may be notified via Radio Resource Control (RRC) signaling, MAC control element (MAC CE) or Downlink Control Information (DCI). For example, a field "PrePostprocessing scaling" may be added in RRC, MAC CE or DCI signaling, to facilitate notifying the joint indication parameter. As another example, fields "Preprocessing scaling" and "Postprocessing scaling" may be added in RRC, MAC CE or DCI signaling, to notify the pre-processing parameter and the post-processing parameter respectively. Furthermore, according to another example of the present disclosure, when the processing configuration information notified by, for example, the joint indication parameter or at least one of the pre-processing parameter and the post-processing parameter is not received in step S401, the processing unit does not perform the pre-processing operation and the post-processing operation.

In addition, existing information of the current communication system may be used to indicate the processing configuration information without setting a new parameter. According to an example of the present disclosure, processing configuration information may be indicated via a Modulation and Coding Scheme (MCS) field in DCI, so as to perform at least one of the pre-processing and the post-processing of the DFT spreading according to the processing configuration information in step S402.

For example, if the MCS in DCI received in step S401 is lower than a specific value or a specific modulation order (for example, QPSK), it is determined to perform time-domain compression processing. In this case, in step S402, zero-padding may be performed on the sequence to be compressed according to at least a part of the compression factor as shown in FIG. 3A as the pre-operation, and correspondingly, data deletion may be performed on the DFT spread sequence as the post-operation. Alternatively, in step S402, zero-padding and re-ordering may be performed on the sequence to be compressed according to at least a part of the compression factor as shown in FIG. 3B as the pre-operation, and correspondingly, the data superimposition operation including phase compensation and superimposition may be performed on the DFT spread sequence as the post-operation.

As another example, if the value of MCS indicated by DCI is located in the middle of the MCS value range, or it is a specific modulation order (for example, 16QAM), it is determined to perform frequency-domain spectrum shaping in the post-processing. Furthermore, if the value of MCS indicated by DCI is higher than a predetermined threshold or a specific modulation order (for example, 64QAM), it is determined that both spectrum spreading and frequency-domain spectrum shaping will be used in the post-processing.

According to another example of the present disclosure, the processing configuration information may be indicated by an operating frequency band field in DCI, such that at least one of the pre-processing and the post-processing of the DFT spreading is performed according to the processing configuration information. For example, if an operating frequency band indicated in DCI is lower than a predetermined value, it may be determined that a head-tail zero sequence insertion operation or a head-tail UW sequence insertion operation is performed in the pre-processing.

According to another example of the present disclosure, the processing configuration information may be indicated jointly by the operating band field and the MCS field in DCI, such that at least one of the pre-processing and the post-processing of the DFT spreading is performed according to the processing configuration information. For example, if the MCS indicated in DCI is lower than a specific threshold or a specific modulation order (for example, QPSK) and an operating frequency band indicated in the scheduling DCI is lower than a certain value, it is determined to perform time-domain compression processing. In this case, in step S402, zero-padding may be performed on the sequence to be compressed according to at least a part of the compression factor as shown in FIG. 3A as the pre-operation, and correspondingly, data deletion may be performed on the DFT spread sequence as the post-operation. Alternatively, in step S402, zero-padding and reordering may be performed on the sequence to be compressed according to at least a part of the compression factor as shown in FIG. 3B as the pre-operation, and correspondingly, a data superimposition operation including phase compensation and superimposition may be performed on the DFT spread sequence as the post-operation. If the MCS indicated in the scheduling DCI is higher than a specific threshold and the operating frequency band indicated in the scheduling DCI is lower than a specific threshold, it may be determined to perform the head-tail zero sequence insertion operation or the head-tail UW sequence insertion operation in the pre-processing. In addition, if the MCS indicated in the scheduling DCI is lower than a specific threshold or a specific modulation order (for example, QPSK) and the operating frequency band indicated in the scheduling DCI is higher than a specific threshold, it is determined to perform the time-domain compression processing of FIG. 3A and the head-tail zero sequence insertion operation or the head-tail UW sequence insertion operation in the pre-processing, or alternatively, it may be determined to perform the time-domain compression processing of FIG. 3B.

In addition, when the value of the MCS field or the operating frequency band field in DCI received in step S401 does not meet the predetermined condition, the pre-processing operation and the post-processing operation may not be performed.

According to an example of the present disclosure, at least one of the pre-processing and the post-processing of the DFT spreading may be determined according to the processing configuration information based on a pre-determined pre-processing and post-processing table. For example, the pre-processing and post-processing table may be a table that includes both the above-mentioned preprocessing and post-processing. Alternatively, sub-tables may be set for the pre-processing and the post-processing, respectively.

According to another example of the present disclosure, the method shown in FIG. 4 may further receive terminal device capability information. At step S402, at least one of the pre-processing and the post-processing of the DFT spreading may be determined according to the terminal device capability information and the processing configuration information. In this case, a plurality of pre-processing and post-processing sub-tables for different UE capabilities may be set in advance. In step S402, a pre-processing and post-processing sub-table corresponding to the terminal device may be determined according to the capability information of the terminal device, and at least one of the pre-processing and the post-processing may be determined according to the processing configuration information.

According to another example of the present disclosure, the method shown in FIG. 4 may further receive key performance indication information. At step S402, at least one of the pre-processing and the post-processing of the DFT spreading may be determined according to the key performance indication information and the processing configuration information. In this case, a plurality of pre-processing and post-processing sub-tables for different key performances may be set in advance. In step S402, a corresponding pre-processing and post-processing sub-tables may be determined according to the key performance indication information, and at least one of the pre-processing and the post-processing may be determined according to the processing configuration information. For example, the key performance indication information may indicate improving at least one of PAPR, spectrum efficiency, and out-of-band leakage.

How to perform at least of the pre-processing and the post-processing of the DFT spreading is explained above in detail with reference to FIGS. 1-3B. According to another example of the present disclosure, the terminal device may further determine whether to perform the DFT spreading operation. For example, the method shown in FIG. 4 may further include determining to perform the DFT spreading operation according to the received processing configuration information when receiving the above processing configuration information, otherwise, not performing DFT spreading operation. As another example, whether to perform the DFT spreading operation may be indicated by scheduling information in DCI signaling. Alternatively, if the value of MCS field of DCI signaling is less than a specific threshold, it may be determined to perform the DFT spreading operation.

In addition, the terminal device may be informed whether to perform the DFT spreading operation by setting a DFT spreading instruction. In this case, the method of FIG. 4 may further include receiving a DFT spreading instruction, and performing the DFT spreading operation according to the DFT spreading instruction, otherwise, not performing the DFT spreading operation. For example, the DFT spreading instruction may be notified by at least one of RRC signaling, MAC CE signaling and DCI signaling.

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. wired and/or wirelessly), and the respective functional blocks may be implemented by these apparatuses.

Figure 5:
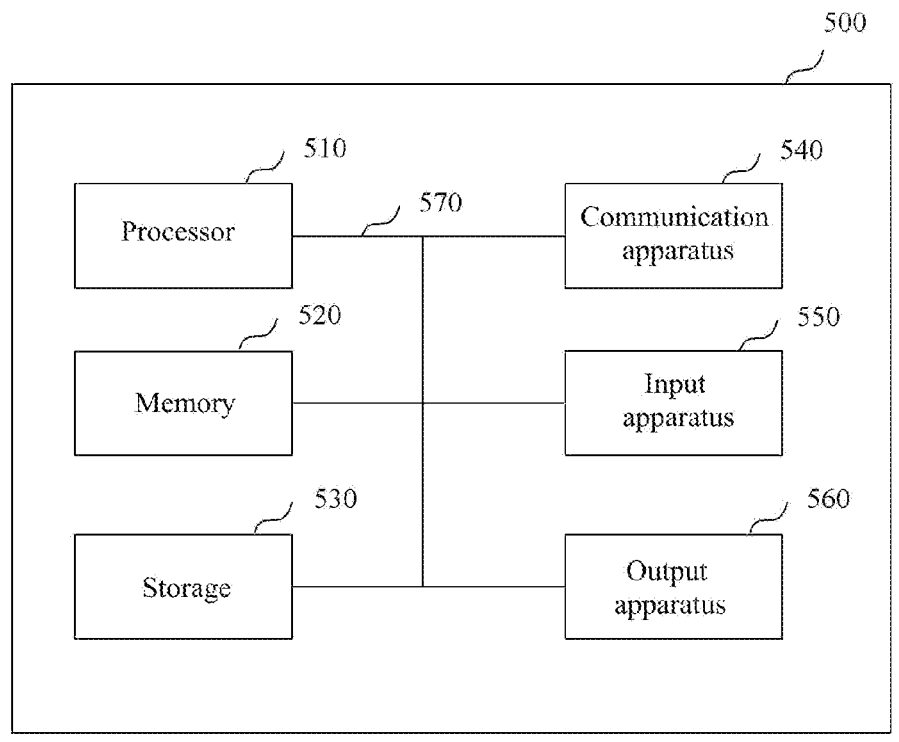
FIG. 5 is a schematic diagram of a hardware structure of a device involved according to an embodiment of the present disclosure.

For example, an electronic device in an embodiment of the present disclosure may function as a computer that executes the processes of the information transmitting method of the present disclosure. FIG. 5 is a schematic diagram of a hardware structure of a device 500 (a terminal device) involved in an embodiment of the present disclosure. The above device 500 (a first network element) may be constituted as a computer apparatus that physically comprises a processor 510, a memory 520, a storage 530, a communication apparatus 540, an input apparatus 550, an output apparatus 560, a bus 570 and the like In addition, in the following description, terms such as "apparatus" may be replaced with circuits, devices, units, and the like. The hardware structure of the electrical device may include one or more of the respective apparatuses shown in the figure, or may not include a part of the apparatuses.

For example, only one processor 510 is illustrated, but there may be multiple processors. Furthermore, processes may be performed by one processor, or processes may be performed by more than one processor simultaneously, sequentially, or with other methods. In addition, the processor 510 may be installed by more than one chip.

Respective functions of any of the device 500 may be implemented, for example, by reading specified software (program) on hardware such as the processor 510 and the memory 520, so that the processor 510 performs computations, controls communication performed by the communication apparatus 540, and controls reading and/or writing of data in the memory 520 and the storage 530.

The processor 510, for example, operates an operating system to control the entire computer. The processor 510 may be constituted by a Central Processing Unit (CPU), which includes interfaces with peripheral apparatuses, a control apparatus, a computing apparatus, a register and the like. For example, the processing unit described above may be implemented by the processor 510.

In addition, the processor 510 reads programs (program codes), software modules and data from the storage 530 and/or the communication apparatus 540 to the memory 520, and execute various processes according to them. As for the program, a program causing computers to execute at least a part of the operations described in the above embodiments may be employed. For example, the processing unit of the electronic device may be implemented by a control program stored in the memory 520 and operated by the processor 510, and other functional blocks may also be implemented similarly.

The memory 520 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 520 may also be referred to as a register, a cache, a main memory (a main storage apparatus) and the like. The memory 520 may store executable programs (program codes), software modules and the like for implementing a method involved in an embodiment of the present disclosure.

The storage 530 is a computer-readable recording medium, and may be constituted, for example, by at least one of a flexible disk, a floppy @disk, a magneto-optical disk (e.g., a Compact Disc ROM (CD-ROM) and the like), a digital versatile disk, a Blu-ray®disk, a removable disk, a hard driver, a smart card, a flash memory device (e.g., a card, a stick and a key driver), a magnetic stripe, a database, a server, and other appropriate storage media. The storage 530 may also be referred to as an auxiliary storage apparatus.

The communication apparatus 540 is a hardware (transceiver device) performing communication between computers via a wired and/or wireless network, and is also referred to as a network device, a network controller, a network card, a communication module and the like, for example. The communication apparatus 540 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 540.

The input apparatus 550 is an input device (e.g., a keyboard, a mouse, a microphone, a switch, a button, a sensor and the like) that receives input from the outside. The output apparatus 560 is an output device (e.g., a display, a speaker, a Light Emitting Diode (LED) light and the like) that performs outputting to the outside. In addition, the input apparatus 550 and the output apparatus 560 may also be an integrated structure (e.g., a touch screen).

Furthermore, the respective apparatuses such as the processor 510 and the memory 520 are connected by the bus 570 that communicates information. The bus 570 may be constituted by a single bus or by different buses between the apparatuses.

Furthermore, the electronic device may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 510 may be installed by at least one of these hardware.

(Variations)

In addition, terms illustrated in the present specification and/or terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a pilot, a pilot signal and so on, depending on the standard applied. Furthermore, a component carrier (CC) may also be referred to as a cell, a frequency carrier, a carrier frequency, and the like.

Furthermore, information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

Names used for parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

Information, signals and the like described in this specification may be represented by using any of a variety of different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a control table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, Downlink Control Information (DCI), Uplink Control Information (UCI)), higher layer signaling (for example, RRC (Radio Resource Control) signaling, broadcast information (Master Information Blocks (MIBs), System Information Blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as RRC messages, for example, RRC connection setup messages, RRC connection reconfiguration messages, and so on. Furthermore, MAC signaling may be reported by using, for example, MAC Control Elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. A base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS) ", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, a wireless base station in this specification may also be replaced with a user terminal. For example, for a structure in which communication between a wireless base station and a user terminal is replaced with communication between a plurality of user terminals (Device-to-Device, D2D), the respective manners/embodiments of the present disclosure may also be applied. In this case, functions provided by the electronic device described above may be regarded as functions provided by a user terminal. Furthermore, the words "uplink" and "downlink" may also be replaced with "side". For example, an uplink channel may be replaced with a side channel.

Also, a user terminal in this specification may be replaced with a wireless base station. In this case, functions provided by the above user terminal may be regarded as functions provided by a first communication device and a second communication device.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched to use during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize Long Term Evolution (LTE), Advanced Long Term Evolution (LTE-A, LTE-Advanced), Beyond Long Term Evolution (LTE-B, LTE-Beyond), the super 3rd generation mobile communication system (SUPER 3G), Advanced International Mobile Telecommunications (IMT-Advanced), the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM®), Code Division Multiple Access 3000 (CDMA 3000), Ultra Mobile Broadband (UMB), IEEE 920.11 (Wi-Fi®), IEEE 920.16 (WiMAX®), IEEE 920.20, Ultra-Wide Band (UWB), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described above in detail, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A terminal device, comprising:
a transceiver configured to receive processing configuration information and terminal device capability information, wherein the processing configuration information indicates at least one of pre-processing and post-processing of Discrete Fourier Transform (DFT) spreading; and
a processor configured to determine at least one of the pre-processing and the post-processing of the DFT spreading according to the terminal device capability information and the processing configuration information.

2. The terminal device of claim 1, wherein
the transceiver is further configured to receive key performance indication information, and
the processor is further configured to determine the at least one of the pre-processing and the post-processing of the DFT spreading according to the key performance indication and the processing configuration information.

3. The terminal device of claim 1, wherein
the pre-processing includes at least one of head sequence and tail sequence insertion, a zero-padding operation, and re-ordering.

4. The terminal device of claim 1, wherein
the post-processing includes at least one of data removal, phase compensation and superimposition, spectrum spreading, and spectrum shaping.

5. The terminal device of claim 1, wherein
the processing configuration information includes a joint indication parameter indicating at least one of the pre-processing and the post-processing of the Discrete Fourier Transform (DFT) spreading; or
the processing configuration information includes at least one of a pre-processing parameter indicating the pre-processing of the DFT spreading and a post-processing parameter indicating the post-processing of the DFT spreading.

6. The terminal device of claim 1, wherein
the processor determines the at least one of the pre-processing and the post-processing of the DFT spreading according to the processing configuration information based on a pre-determined pre-processing and post-processing table.

7. The terminal device of claim 1, wherein
the processor further performs a DFT spreading operation according to the processing configuration information.

8. The terminal device of claim 1, wherein
the transceiver is configured to receive a DFT spreading instruction; and
the processor is further configured to perform a DFT spreading operation according to the DFT spreading instruction.

9. A processing method applied to a terminal device, comprising:
receiving processing configuration information and terminal device capability information, wherein the processing configuration information indicates at least one of pre-processing and post-processing of Discrete Fourier Transform (DFT) spreading; and determining at least one of the pre-processing and the post-processing of the DFT spreading according to the terminal device capability information and the processing configuration information.

* * * * *